(12) United States Patent
Jinn et al.

(10) Patent No.: US 7,785,022 B2
(45) Date of Patent: Aug. 31, 2010

(54) METHODS FOR START-UP LENS

(75) Inventors: Yu-Shuh Jinn, Changhua County (TW); Ming-Chyi Yang, Changhua County (TW); Hsin-Ho Lin, Changhua County (TW)

(73) Assignee: Asia Optical Co., Inc., Taichung (TW)

( * ) Notice: Subject to any disclaimer, the term of this patent is extended or adjusted under 35 U.S.C. 154(b) by 688 days.

(21) Appl. No.: 11/745,497

(22) Filed: May 8, 2007

(65) Prior Publication Data
US 2007/0263502 A1    Nov. 15, 2007

(30) Foreign Application Priority Data
May 9, 2006    (TW) ............................. 95116393 A (51) Int. Cl.
*G03B 5/02*    (2006.01)

(52) U.S. Cl. .......................... 396/349; 396/75; 396/86; 396/133; 396/136

(58) Field of Classification Search .................. 396/133, 396/136, 348, 349, 350, 75, 86, 90; 369/44.17; 360/73.05, 73.08
See application file for complete search history.

(56) References Cited

U.S. PATENT DOCUMENTS

| | | | |
|---|---|---|---|
| 6,381,076 B1 * | 4/2002 | Kashiwaba | 359/701 |
| 6,480,677 B1 * | 11/2002 | Uno | 396/83 |
| 6,839,086 B1 * | 1/2005 | Katagiri | 348/347 |
| 2002/0141744 A1 * | 10/2002 | Masuda | 396/83 |

* cited by examiner

*Primary Examiner*—Clayton E Laballe
*Assistant Examiner*—Linda B Smith
(74) *Attorney, Agent, or Firm*—Thomas, Kayden, Horstemeyer & Risley (57) ABSTRACT

Methods for start-up lens. The lens moves from a stowing position to a standby position along an axis, and a reset point, a first turning point, a second turning point, and a third turning point are defined in sequence during the movement. A drive unit rotates at a first angular velocity to drive the lens in a first route, rotates at a second angular velocity to drive the lens in a second route, and rotates at a third angular velocity to drive the lens in a third route.

20 Claims, 8 Drawing Sheets

FIG. 8

METHODS FOR START-UP LENS

BACKGROUND OF THE INVENTION

1. Field of the Invention

The disclosure relates generally to methods for start-up lens, and, more particularly to methods for improving start-up fluency of a lens.

2. Description of the Related Art

Figure 1:
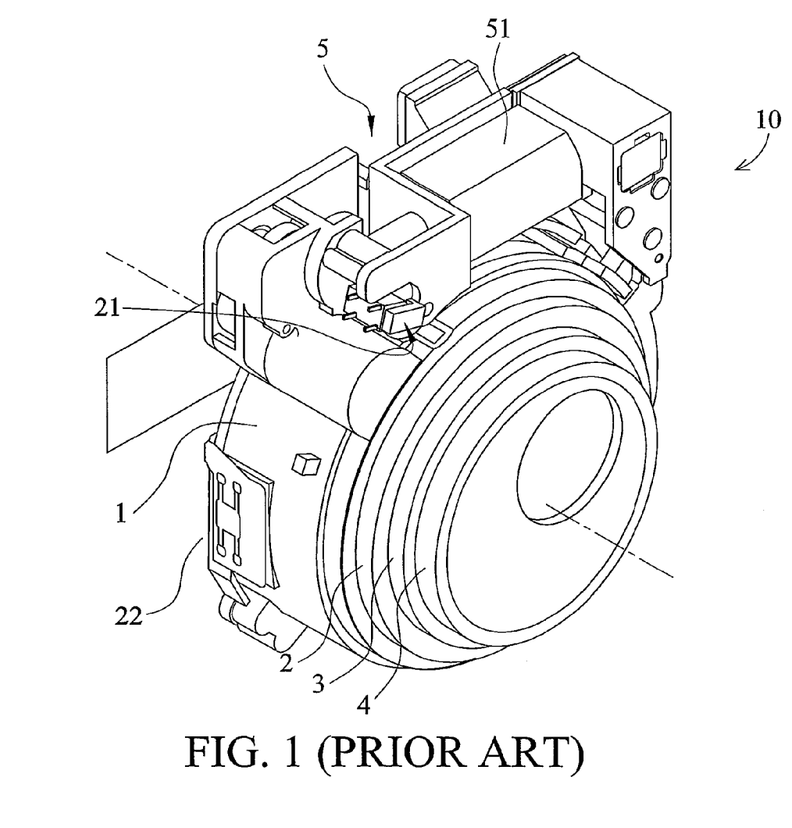
FIG. 1 is a 3D diagram illustrating a telescopic lens at a reset position.
Figure 2:
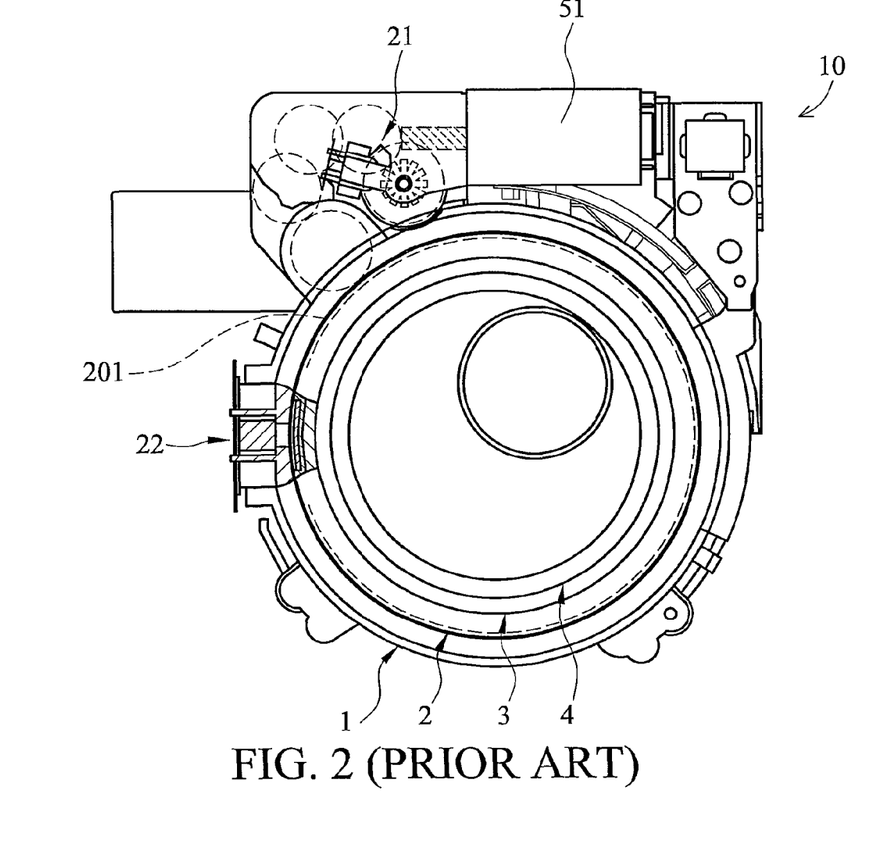
FIG. 2 is a front view of the lens at the reset position.
Figure 3:
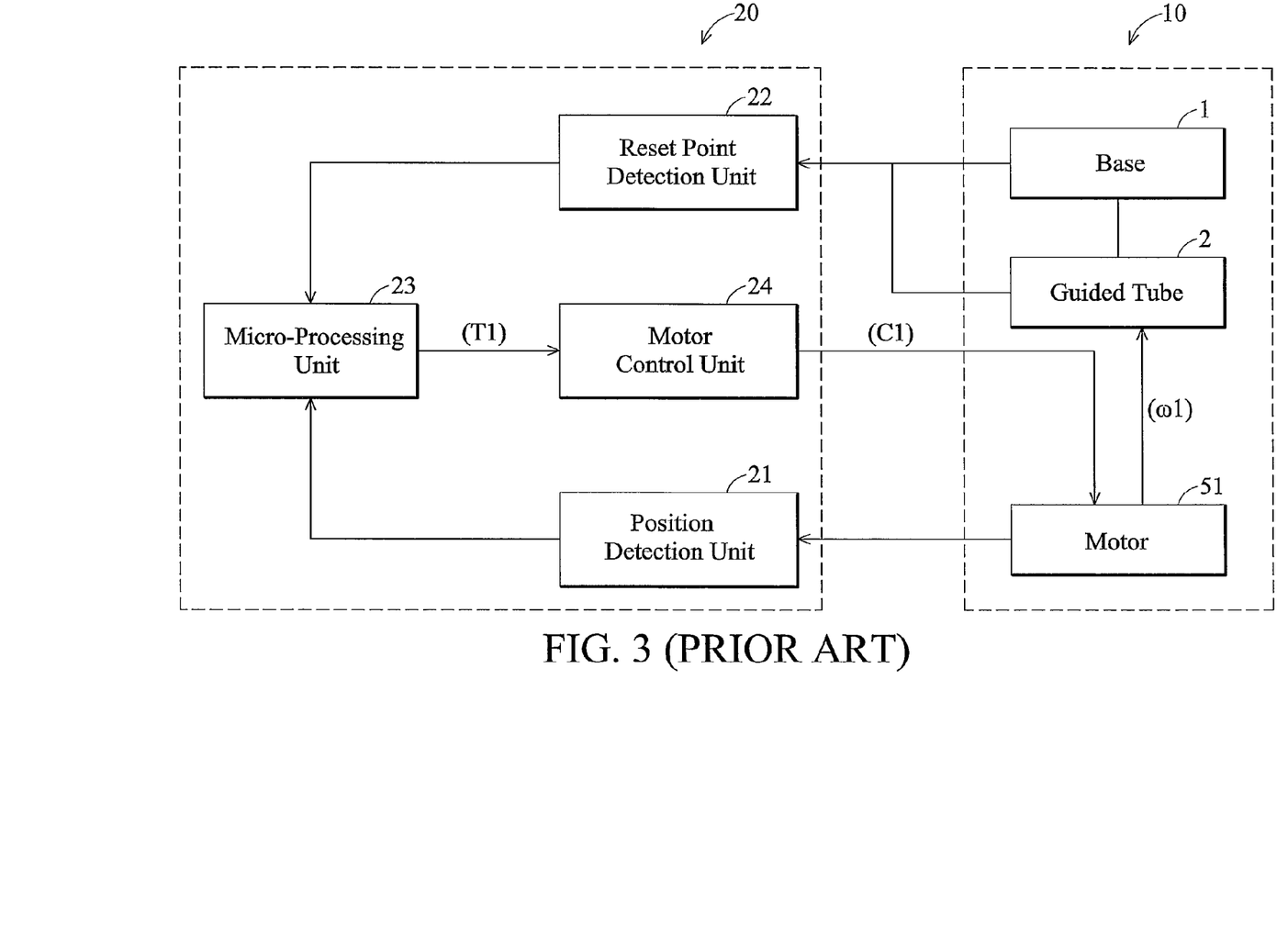
FIG. 3 is a schematic diagram illustrating a conventional control system controlling lens lengthening and shortening.

FIGS. 1, 2 and 3 show a lens 10 and a control system 20. The lens 10 can move along an axis L1. The control system 20 controls the lengthening and shortening of the lens 10.

The lens 10 comprises a base 1, a guided tube 2 telescoped to the base 1, an inner tube 3 inside the guided tube 2, a lens chamber unit 4 inside the inner tube 3, and a drive unit 5 driving the movement of the lens 10. The drive unit 5 comprises a motor 51 set on the base 1.

Figure 4:
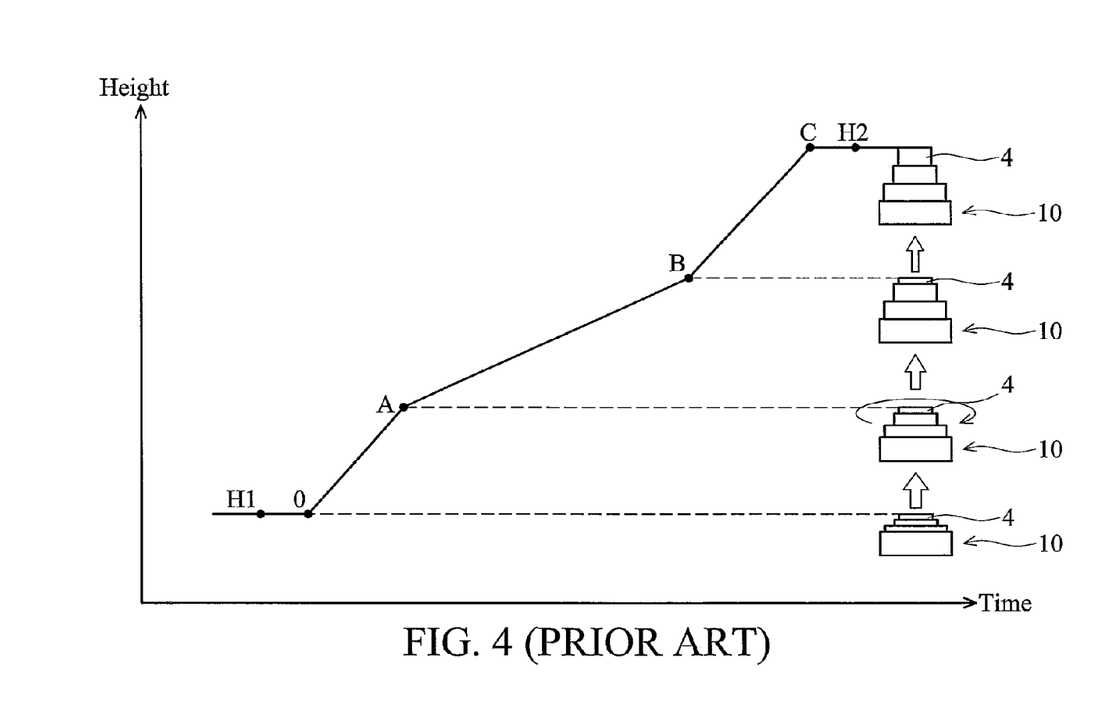
FIG. 4 shows the relationship between lens position and time during lens lengthening, explaining the variation of lengthening speed.

Referring to FIGS. 1, 2 and 4, when the system starts up, the motor 51 drives the lens 10 from a stowing position H1 to a standby position H2, and a reset point O, a first turning point A, a second turning point B, and a third turning point C are defined in sequence during the movement. During the lengthening of the lens 10, the lens chamber unit 4 progresses in a straight line between the reset point O and the first turning point A, progresses and revolves on its own axis between the first turning point A and the second turning point B, and progresses in a straight line between the second turning point B and the third turning point C.

As shown in FIGS. 2, 3 and 4, the control system 20 comprises a position detection unit 21 coupled to the lens 10, a reset point detection unit 22, a micro-processing unit 23 coupled to the position detection unit 21 and the reset point detection unit 22, and a motor control unit 24 coupled to the micro-processing unit 23 and the motor 51.

If the base 1 senses the lens 10 controlled by the control system 20 to move through the reset point O, a reset point signal is output to the micro-processing unit 23, and the micro-processing unit 23 can determine the position of the reset point O. If the motor 51 continues to rotate, a rotation signal is output to the micro-processing unit 23 for determining the extending position of the lens 10.

During start-up of the system, the micro-processing unit 23 outputs a first signal T1 to the motor control unit 24, and the motor control unit 24 outputs a corresponding first command C1 in response to the first signal T1. The first command C1 rotates the motor 51 with a first angular velocity ω1, driving the guided tube 2 to rotate and leave the base 1. Simultaneously, the inner tube 3 and the lens chamber unit 4 are driven to rotate and leave the base 1, causing the lens 10 to lengthen from the stowing position H1 to the standby position H2.

In the above method, the micro-processing unit 23 outputs the first signal T1 to the motor control unit 24, and the motor control unit 24 outputs the first command C1 corresponding to the first signal T1, where the first command C1 is a fixed voltage rotating the motor 51 at a fixed angular velocity. Conventionally, the lens can be driven to move, but drawbacks result.

First, the lens lengthening is not fluent since the lengthening speed between the first and second turning points A and B is slower than other routes (the reset point O to the first turning point A, and second turning point B to the third turning point C). Second, noises may be generated during the switch of lengthening speeds at the first, second, and third turning points.

BRIEF SUMMARY OF THE INVENTION

Methods for start-up lens are provided.

In an embodiment of a method for start-up lens for use in a lens comprising an optical component, and a control system controlling a drive unit to drive the lens moving from a stowing position to a standby position along an axis, where a reset point, a first turning point, a second turning point, and a third turning point are defined in sequence during the movement. The drive unit rotates at a first angular velocity to drive the lens to lengthen in a first route, where the first route is from the stowing position to a first switch point, and the first switch point is between the first turning point and the second turning point. The drive unit rotates at a second angular velocity to drive the lens to continue lengthening in a second route, where the second route is from the first switch point to a second switch point, and the second switch point is between the first switch point and the second turning point. The drive unit rotates at a third angular velocity to drive the lens to lengthen in a third route, where the third route is from the second switch point to the standby position.

Methods for start-up lens may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods for start-up lens are provided. It is understood that similar components in the embodiments are used the same reference numbers.

Figure 5:
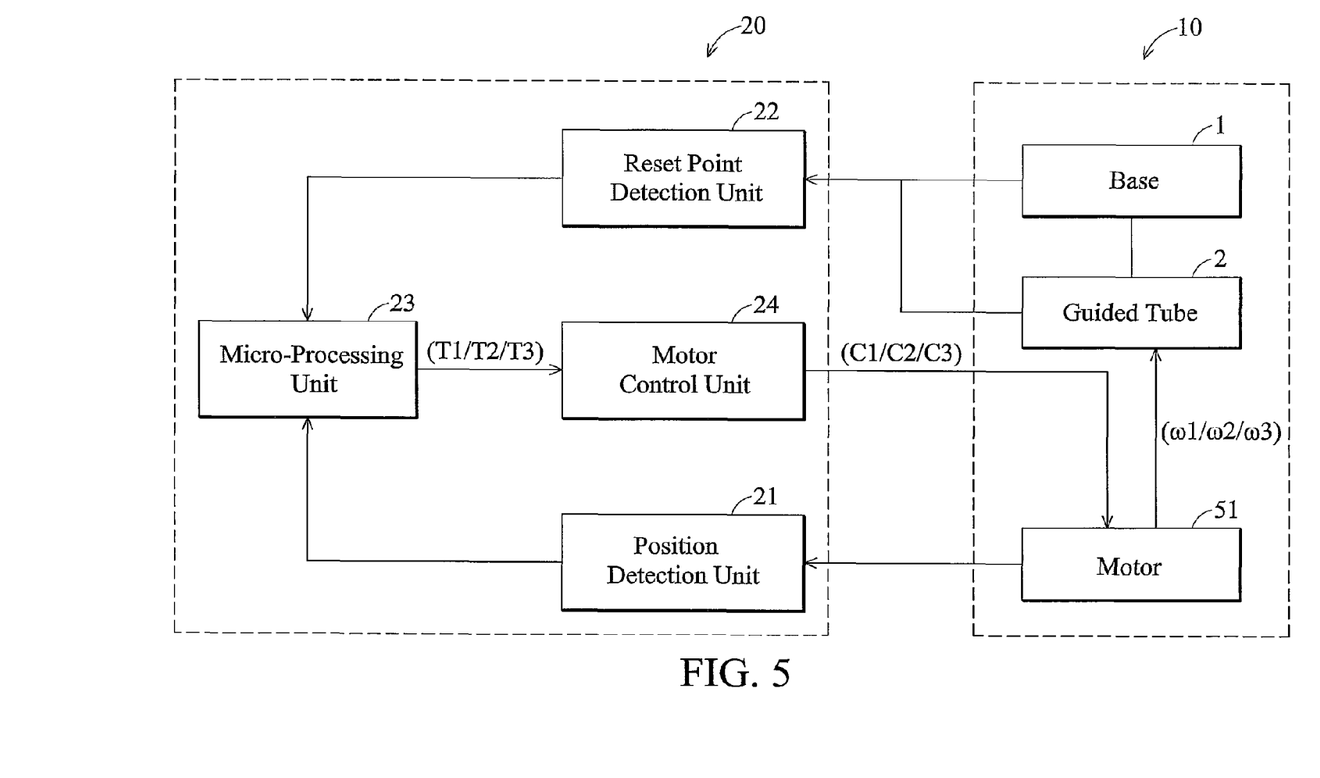
FIG. 5 is a schematic diagram illustrating a first embodiment of a control system implementing a method for start-up lens.
Figure 6:
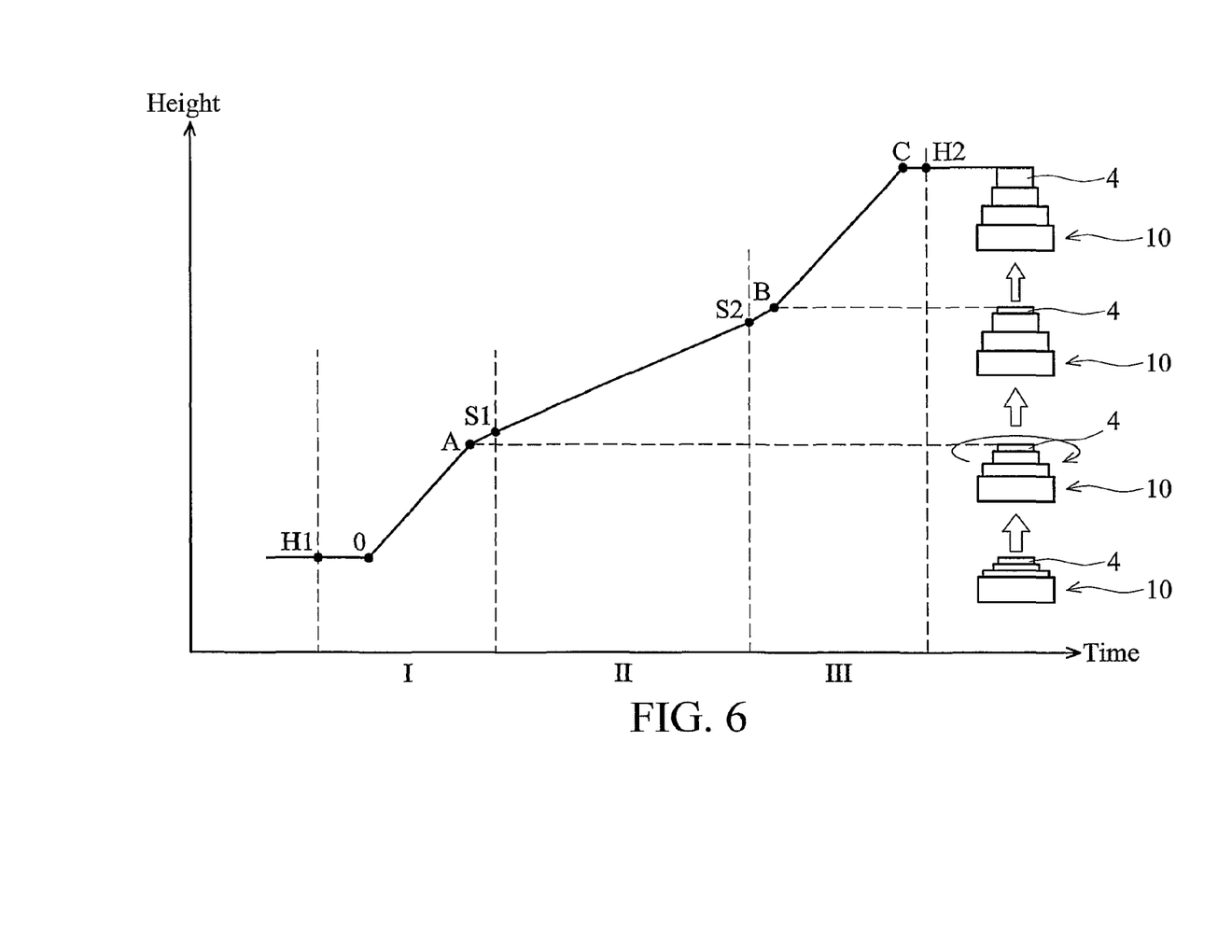
FIG. 6 shows the variation of lens lengthening speed between routes according to the first embodiment.

FIG. 5 is a schematic diagram illustrating a first embodiment of a control system implementing a method for start-up lens. The system can be applied in a capturing device comprising a telescopic lens, such as a camera. The lens 10 comprises an optical component, and hardware structure thereof is similar to that in FIGS. 1 and 2. For example, as shown in FIG. 5, the lens 10 is controlled by a control system 20. The inner structure and connection relationships of the control system 20 are similar to those in FIG. 3, but different in control signal, command, and angular velocity. For simplicity, the drive unit is implemented using a motor 51 in this embodiment, but is not limited thereto. As shown in FIGS. 1, 5 and 6, the method for improving start-up fluency of lens comprises the following steps.

The control system 20 drives the motor 51 to rotate at a first angular velocity ω1, driving the lens 10 to lengthen in a first route I. The first route I is from the stowing position H1 to a first switch point S1. The first switch point S1 is between the first turning point A and the second turning point B. Specifically, in the first route I, the micro-processing unit 23 receives signals from the position detection unit 21 and the reset point detection unit 22, and determines a terminal point of the first route I accordingly. At this time, the micro-processing unit 23 outputs a first signal T1 to the motor control unit 24, and the motor control unit 24 outputs a first command C1 correspondingly. For example, the driving voltage for the first command C1 may be 4.4V, and the PWM (Pulse Width Modulation) for the first command C1 comprises at least two duty cycles such as 85% and 70%. The duty cycles can be switched in different time units, or a specific period such as 5 ms, such that the first angular velocity ω1 is a mix velocity driving the lens 10 to lengthen.

The control system 20 drives the motor 51 to rotate at a second angular velocity ω2, driving the lens 10 to lengthen in a second route II. The second route II is from the first switch point S1 to a second switch point S2. The second switch point S2 is between the first switch point S1 and the second turning point B. The second angular velocity ω2 may exceed the first angular velocity ω1. Specifically, in the second route II, the micro-processing unit 23 receives signals from the position detection unit 21, and determines a start point and a terminal point of the second route II accordingly. At this time, the micro-processing unit 23 outputs a second signal T2 to the motor control unit 24, and the motor control unit 24 outputs a second command C2 correspondingly. For example, the driving voltage for the second command C2 may be 4.4V, and the PWM for the second command C2 comprises at least one duty cycles such as 100%. The motor 51 rotates at the second angular velocity ω2 according to the driving voltage and PWM for the second command C2, driving the lens 10 to lengthen.

The control system 20 drives the motor 51 to rotate at a third angular velocity ω3, driving the lens 10 to lengthen in a third route III. The second route II is from the second switch point S2 to the standby position H2. The third angular velocity ω3 may be smaller than the second angular velocity ω2, and the first angular velocity ω1 exceeds the third angular velocity ω3. Specifically, in the third route III, the micro-processing unit 23 receives signals from the position detection unit 21, and determines a start point and a terminal point of the third route III accordingly. At this time, the micro-processing unit 23 outputs a third signal T3 to the motor control unit 24, and the motor control unit 24 outputs a third command C3 correspondingly. For example, the driving voltage for the third command C3 may be 3V, and the PWM for the second command C2 comprises at least two duty cycles such as 85% and 65%. The duty cycles can be switched in different time unit, or a specific period such as 5 ms, such that the third angular velocity ω3 is a mix velocity driving the lens 10 to lengthen.

The invention has following advantages.

First, the micro-processing unit 23 generates various signals (T1, T2 and T3) for respective routes, and the motor control unit 24 outputs various commands (C1, C2 and C3) accordingly to the motor 51. The motor 51 can rotate at various angular velocity (ω1, ω2 and ω3) corresponding to the commands (C1, C2 and C3), driving the lens to lengthen. For example, the motor 51 can rotate at an angular velocity exceeding the first angular velocity and the third angular velocity in the second route II between the first turning point A and the second turning point B (ω2>ω1 and ω2>ω3). In this way, the lengthening speed of the lens during the entire start-up process will be more average, improving the lengthening fluency of lens.

Second, the motor 51 can rotate at various angular velocities in respective routes. For example, the motor 51 can rotate at an angular velocity smaller than the second angular velocity in the first and second routes comprising the first, second and third turning points (A, B and C) (ω1<ω2 and ω3<ω2). In this way, noise generated during speed switch at the turning points can be reduced.

Figure 7:
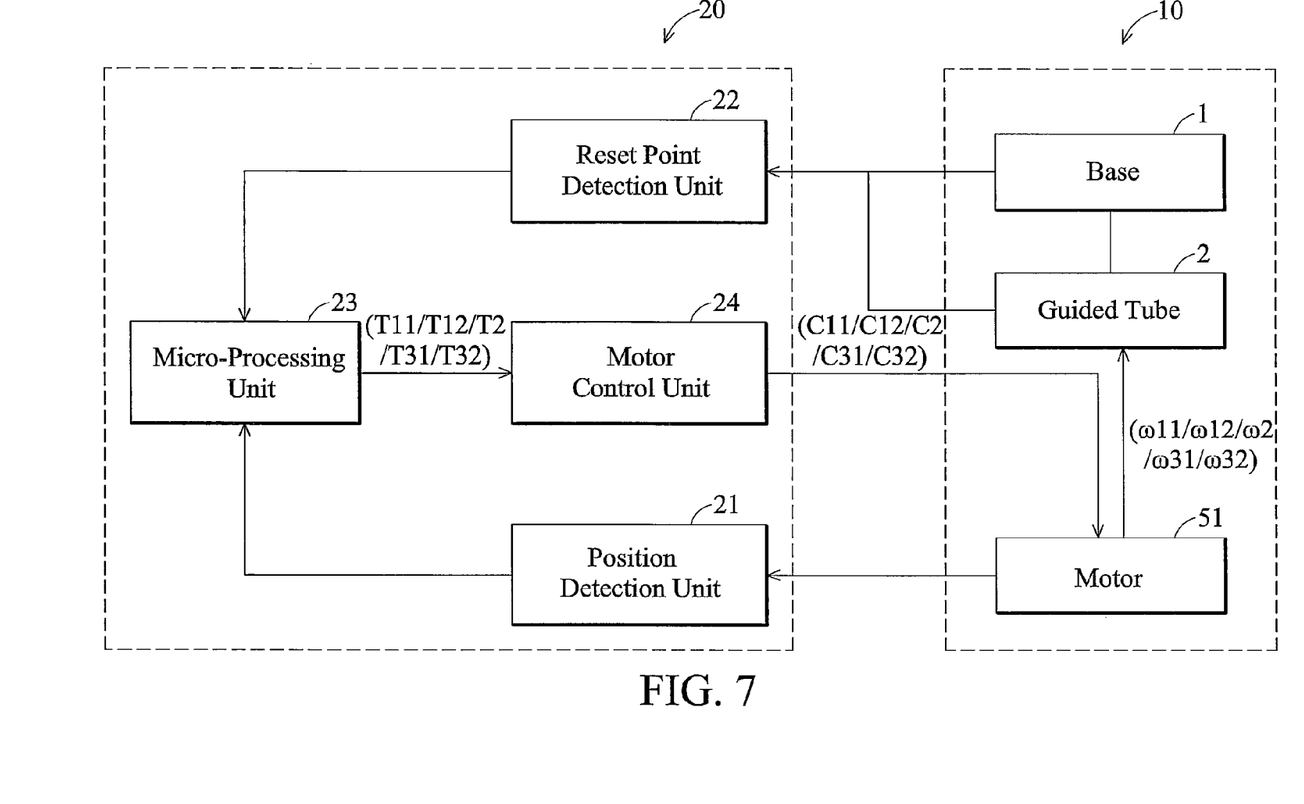
FIG. 7 is a schematic diagram illustrating a second embodiment of a control system implementing a method for start-up lens.
Figure 8:
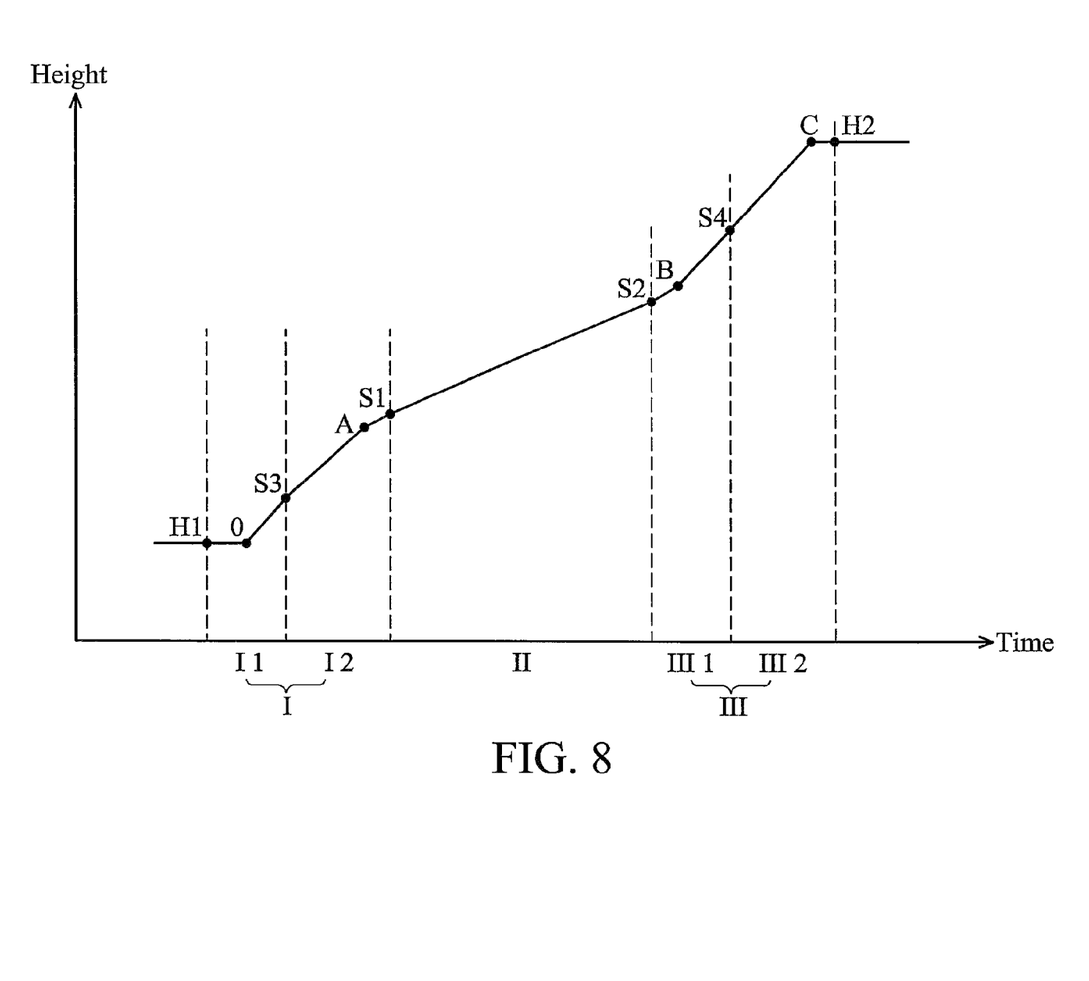
FIG. 8 shows the variation of lens lengthening speed between routes according to the second embodiment.

FIG. 7 is a schematic diagram illustrating a second embodiment of a control system implementing a method for start-up lens. The system can be applied in a capturing device comprising a telescopic lens, such as a camera. The lens 10 comprises an optical component, and hardware structure thereof is similar to that in FIGS. 1 and 2. For example, as shown in FIG. 5, the lens 10 is controlled by a control system 20. The inner structure and connection relationships of the control system 20 are similar to those in FIG. 3, but different in control signal, command, and angular velocity. For simplicity, the drive unit is implemented using a motor 51 in this embodiment, but is not limited thereto. As shown in FIGS. 1, 7 and 8, the method for improving start-up fluency of lens comprises the following steps.

The control system 20 drives the motor 51 to rotate at at least two angular velocities, driving the lens 10 to lengthen in a first route I. For example, the motor 51 drives the lens 10 to lengthen based on a first preceding angular velocity ω11 and a first subsequent angular velocity ω12. The first preceding angular velocity ω11 may exceed the first subsequent angular velocity ω12. The first route I is from the stowing position H1 to a first switch point S1. The first switch point S1 is between the first turning point A and the second turning point B. It is noted that the first route I further comprises a first preceding route I1 and a first subsequent route I2 (two sub-routes). The first preceding route I1 is from the stowing position H1 to a third switch point S3, where the third switch point S3 is between the reset point O and the first turning point A. The first subsequent route I2 is from the third switch point S3 to the first switch point S1. Specifically, in the first preceding route I1 and the first subsequent route I2, the micro-processing unit 23 receives signals from the position detection unit 21 and the reset point detection unit 22, and determines terminal points of the first preceding route I1 and the first subsequent route I2 accordingly. At this time, the micro-processing unit 23 outputs a first preceding signal T11 and a first subsequent signal T12 to the motor control unit 24, and the motor control unit 24 outputs a first preceding command C11 and a first subsequent command C12 correspondingly. For example, the driving voltage for the first preceding command C11 and the first subsequent command C12 may be both 4.4V, and the duty cycles of PWM for the first preceding command C11 and the first subsequent command C12 are 80% and 60%, respectively, driving the motor 51 to rotates at the first preceding angular velocity ω11 and the first angular subsequent velocity ω12.

The control system 20 drives the motor 51 to rotate at a second angular velocity ω2, driving the lens 10 to lengthen in a second route II. The second route II is from the first switch point S1 to a second switch point S2. The second switch point S2 is between the first switch point S1 and the second turning point B. The second angular velocity ω2 may exceed the first preceding velocity ω11 and the first subsequent velocity ω12. Specifically, in the second route II, the micro-processing unit 23 receives signals from the position detection unit 21, and determines a start point and a terminal point of the second route II accordingly. At this time, the micro-processing unit 23 outputs a second signal T2 to the motor control unit 24, and the motor control unit 24 outputs a second command C2 correspondingly. For example, the driving voltage for the second command C2 may be 4.4V, and the duty cycle of PWM for the second command C2 may be 100%. The motor 51 rotates at the second angular velocity ω2 according to the driving voltage and PWM for the second command C2, driving the lens 10 to lengthen.

The control system 20 drives the motor 51 to rotate at at least two angular velocities, driving the lens 10 to lengthen in a third route III. For example, the motor 51 drives the lens 10 to lengthen based on a third preceding angular velocity ω31 and a third subsequent angular velocity ω32. The third preceding angular velocity ω31 exceeds the third subsequent angular velocity ω32. The third route III is from the second switch point S2 to the standby position H2. The third preceding angular velocity ω31 and the third subsequent angular velocity ω32 are smaller than the second angular velocity ω2. The third route III further comprises a third preceding route III1 and a third subsequent route III2 (two sub-routes). The third preceding route III1 is from the second switch point S2 to a fourth switch point S4, where the fourth switch point S4 is between the second turning point B and the third turning point C. The third subsequent route III2 is from the fourth switch point S4 to the standby position H2. Specifically, in the third preceding route III1 and the third subsequent route III2, the micro-processing unit 23 receives signals from the position detection unit 21, and determines start points and terminal points of the third preceding route III1 and the third subsequent route III2 accordingly. At this time, the micro-processing unit 23 outputs a third preceding signal T31 and a third subsequent signal T32 to the motor control unit 24, and the motor control unit 24 outputs a third preceding command C31 and a third subsequent command C32 correspondingly. For example, the driving voltage for the third preceding command C31 and the third subsequent command C32 may be both 3V, and the duty cycles of PWM for third preceding command C31 and the third subsequent command C32 are 30% and 20%, respectively, driving the motor 51 to rotate at the third preceding velocity ω31 and the third subsequent velocity ω32.

The second embodiment may have the same advantages in the first embodiment.

In lens mechanism, noise may be easily generated at the turning points during lens lengthening and shortening. In the invention, the turning points are separated into different routes, and respective control signals and commands with various voltages and PWMs are generated for respective routes. The motor can rotate at different angular velocities in respective routes, improving the lengthening fluency of lens, and reducing the noise during lens lengthening.

Methods for start-up lens, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Thus, the scope of the invention shall be defined and protected by the following claims and their equivalents.

What is claimed is:

1. A method for start-up lens for use in a lens comprising an optical component, and a control system controlling a drive unit to drive the lens moving from a stowing position to a standby position, where a reset point, a first turning point, a second turning point, and a third turning point are defined in sequence during the movement, the method comprising:
   rotating the drive unit at a first angular velocity to drive the lens to lengthen in a first route, where the first route is from the stowing position to a first switch point, and the first switch point is between the first turning point and the second turning point;
   rotating the drive unit at a second angular velocity to drive the lens to continue lengthening in a second route, where the second route is from the first switch point to a second switch point, and the second switch point is between the first switch point and the second turning point; and
   rotating the drive unit at a third angular velocity to drive the lens to lengthen in a third route, where the third route is from the second switch point to the standby position.

2. The method of claim 1 further comprising driving a lens chamber unit of the lens to progress in a straight line between the reset point and the first turning point, progress and revolve on its own axis between the first turning point and the second turning point, and progress in a straight line between the second turning point and the third turning point.

3. The method of claim 2 wherein the control system further comprises a position detection unit coupled to the lens, a reset point detection unit, a micro-processing unit coupled to the position detection unit and the reset point detection unit, and a drive control unit coupled to the micro-processing unit and the drive unit, and the method further comprises:
   in the first route, the micro-processing unit receiving signals from the position detection unit and the reset point detection unit, determining a terminal point of the first route accordingly, outputting a first signal to the drive control unit, and the drive control unit outputting a first command correspondingly, rotating the drive unit at the first angular velocity;
   in the second route, the micro-processing unit receiving signals from the position detection unit, determining a start point and a terminal point of the second route accordingly, outputting a second signal to the drive control unit, and the drive control unit outputting a second command correspondingly, rotating the drive unit at the second angular velocity; and
   in the third route, the micro-processing unit receiving signals from the position detection unit, determining a start point and a terminal point of the third route accordingly, and outputting a third signal to the drive control unit, and the drive control unit outputting a third command correspondingly, rotating the drive unit at the third angular velocity.

4. The method of claim 3 further comprising the drive control unit outputting the first command, where PWM (Pulse Width Modulation) for the first command comprises at least two duty cycles, and the duty cycles are switched in different time units, causing the first angular velocity to be a mixed velocity.

5. The method of claim 4 further comprising the drive control unit outputting the first command, where the duty cycles of the PWM for the first command comprises a first value and a second value, and the duty cycles are switched in a first time unit.

6. The method of claim 4 wherein the first route comprises at least two sub-routes, and the method further comprises rotating the drive unit at least two angular velocities, where the two angular velocities are not equal.

7. The method of claim 6 wherein the first route further comprises a first preceding route and a first subsequent route, and the method further comprises rotating the drive unit at a first preceding angular velocity in the first preceding route, and at a first subsequent angular velocity in the first subsequent route, where the first preceding route is from the stowing position to a third switch point, the third switch point is between the reset point and the first turning point, and the first subsequent route is from the third switch point to the first switch point.

8. The method of claim 7 further comprising, in the first route, the micro-processing unit receiving the signals from the position detection unit and the reset point detection unit, determining terminal points of the first preceding route and the first subsequent route accordingly, and outputting a first preceding signal and a first subsequent signal to the drive control unit, and the drive control unit outputting a first preceding command and a first subsequent command correspondingly, rotating the drive unit at a first preceding angular velocity and a first subsequent angular velocity.

9. The method of claim 3 further comprising the drive control unit outputting the second command, where a duty cycle of PWM (Pulse Width Modulation) for the second command is a third value.

10. The method of claim 3 further comprising the drive control unit outputting the third command in the third route, where PWM (Pulse Width Modulation) for the third command comprises at least two duty cycles, and the duty cycles are switched in different time units, causing the third angular velocity to be a mixed velocity.

11. The method of claim 10 further comprising the drive control unit outputting the third command, where the duty cycles of the PWM for the third command comprises a fourth value and a fifth value, and the duty cycles are switched in a second time unit.

12. The method of claim 10 wherein the third route comprises at least two sub-routes, and the method further comprises rotating the drive unit at least two angular velocities, where the two angular velocities are not equal.

13. The method of claim 12 wherein the third route further comprises a third preceding route and a third subsequent route, and the method further comprises rotating the drive unit at a third preceding angular velocity in the third preceding route, and at a third subsequent angular velocity in the third subsequent route, where the third preceding route is from the second switch point to a fourth switch point, the fourth switch point is between the second turning point and the third turning point, and the third subsequent route is from the fourth switch point to the standby position.

14. The method of claim 13 further comprising:
in the third route, the micro-processing unit receiving the signals from the position detection unit, determining start points and terminal points of the third preceding route and the third subsequent route accordingly, and outputting a third preceding signal and a third subsequent signal to the drive control unit, and the drive control unit outputting a third preceding command and a third subsequent command correspondingly, rotating the drive unit at a third preceding angular velocity and a third subsequent angular velocity.

15. The method of claim 14 wherein the third preceding angular velocity exceeds the third subsequent angular velocity.

16. The method of claim 1 wherein the first angular velocity is smaller than the second angular velocity.

17. The method of claim 16 wherein the second angular velocity exceeds the third angular velocity.

18. The method of claim 17 wherein the first angular velocity exceeds the third angular velocity.

19. The method of claim 1 wherein the drive unit comprises a motor.

20. The method of claim 3 wherein the drive control unit comprises a motor control unit.

* * * * *